INVENTOR.
BY CLIFFORD H. MAY

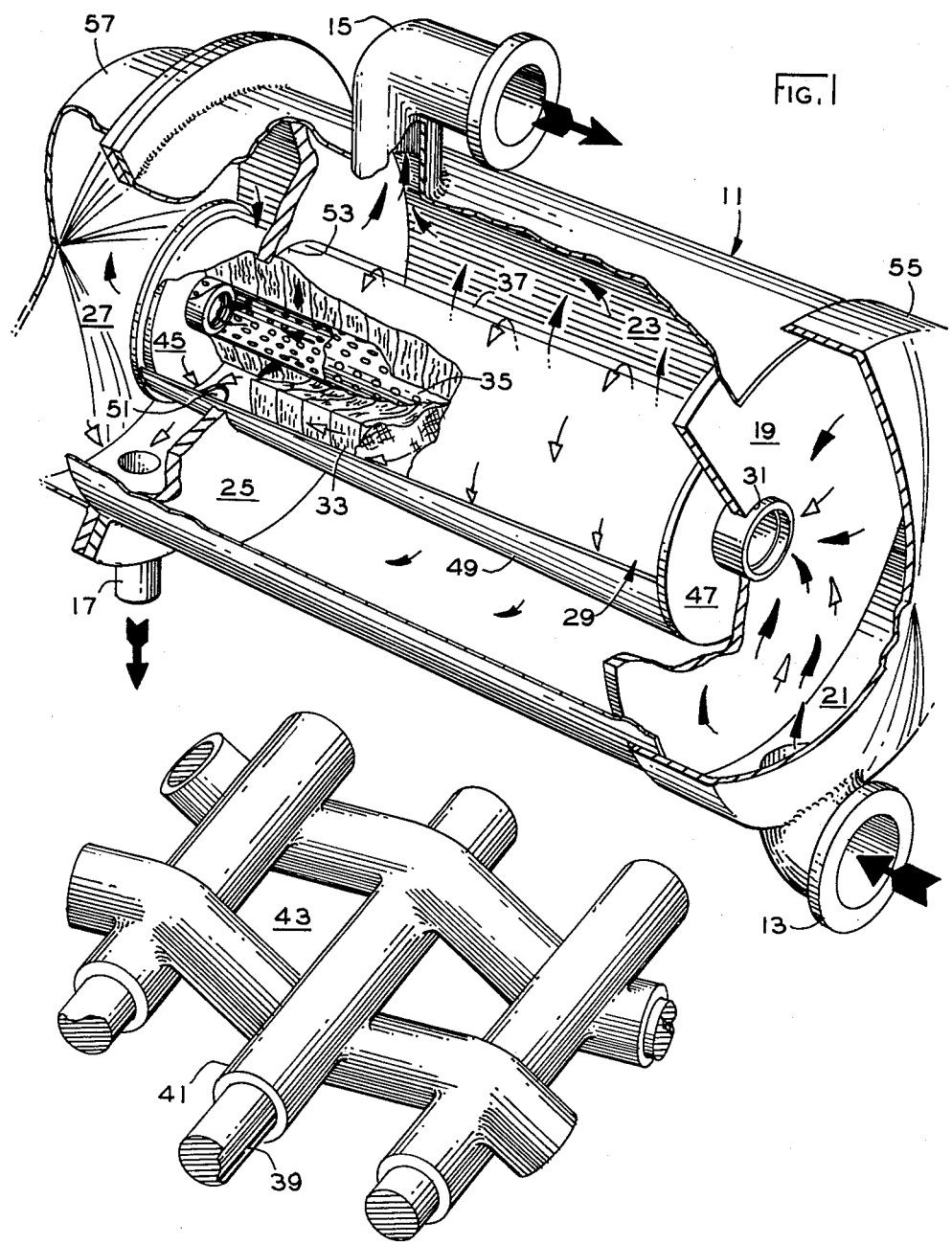

3,085,690
WATER SEPARATOR
Clifford H. May, Fairfax, Va., assignor to The Briggs Filtration Company, Washington, D.C., a corporation of Maryland
Filed Mar. 2, 1959, Ser. No. 796,493
3 Claims. (Cl. 210—307)

This invention relates to a permanent water separator element for a water-fuel separator and is more particularly adapted for separating coalesced water from fuel such as JP-4, JP-5 and Avgas.

In the prior art the water separating elements were made from pleated paper which is saturated with resin and silicone to make it water repellent. The paper type water separator element becomes inoperable and loses its efficiency after prolonged exposure to water due to the fact the paper becomes saturated whereupon it will pass the water. Also, due to the very nature of the paper, difficulties in manufacturing are experienced in forming adhesive bonds at the ends of the element, and due to manual handling of the element in shipping the paper is often susceptible to damage such as cracking, holes in the paper, or the creating of end seal leaks. It is, therefore, a salient object of this invention to provide a permanent type separating media which will obviate the above disadvantages of the paper type water separating element.

It is a further object of this invention to provide a water separating element of fine mesh screen coated with tetrafluorethylene resin which serves to increase the interfacial tension between the screen and water. In other words, it is impossible to wet the resin coated screen with water regardless of the pressure differential across the element, or, regardless of the flow rate of the fuel.

It is yet another object of the invention to provide a permanent water separator element of fine mesh screen wherein the pore openings are very small and are absolutely fixed and cannot be expanded by increased pressure differential.

These and other objects will become apparent from a study of this specification and the drawings which are attached hereto, and made a part hereof and in which:

FIGURE 1 is an isometric view of a water-fuel separator with parts broken away to illustrate the water separator element;

FIGURE 2 is an enlarged isometric view of a section of the water separator element.

Figure 3:
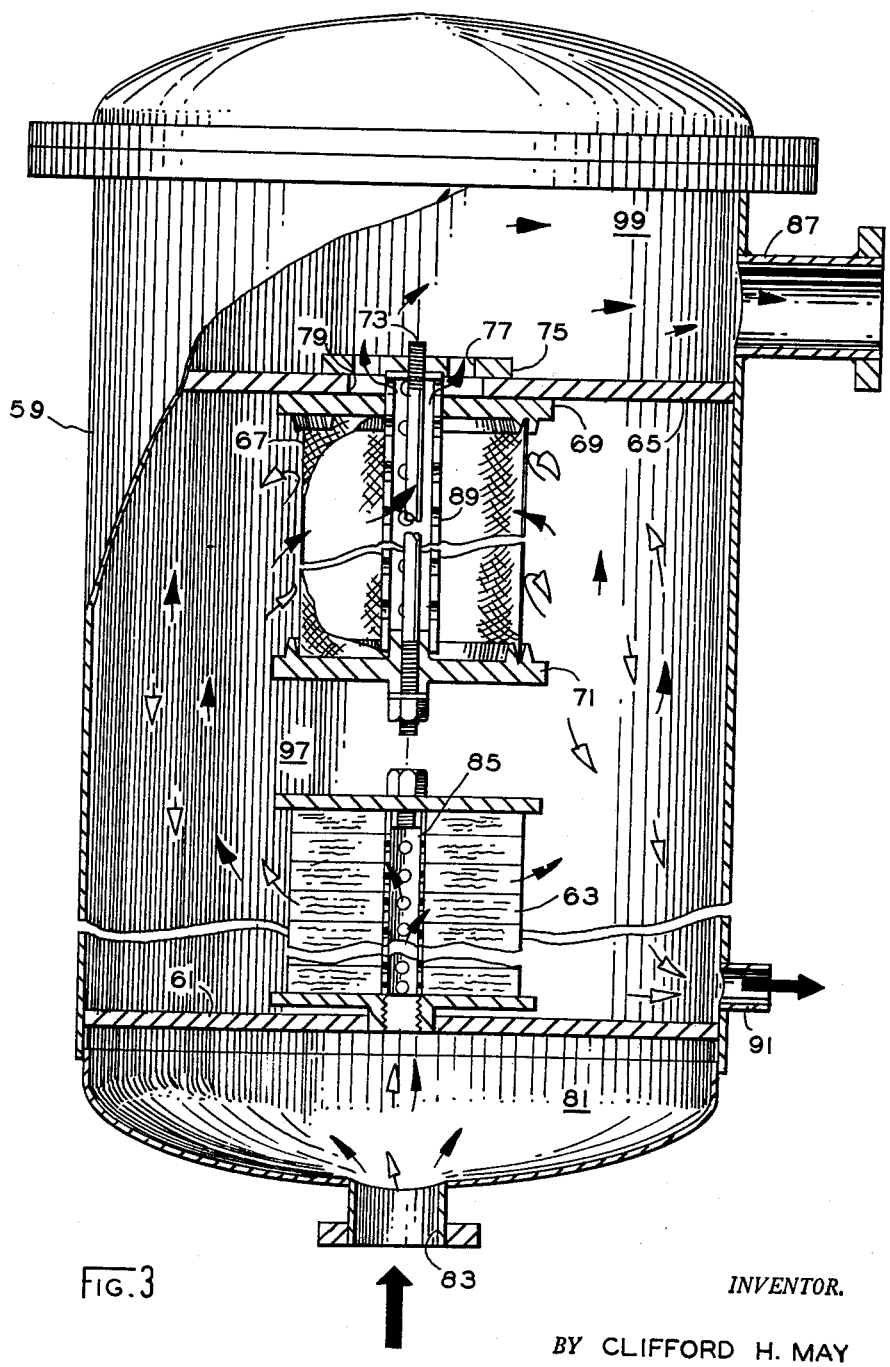
FIGURE 3 is a vertical sectional view of a water-fuel separator with parts in section showing a modification of the present invention.

Referring to the drawings, and particularly FIGURE 1, the reference numeral 11 designates a horizontal water-fuel separator tank having a fuel inlet 13, a dry fuel outlet 15, and a water drain 17. The tank is provided with a deck plate or partition 19 extending across one end to form an inlet chamber 21, and an effluent chamber 23. Another deck plate or partition 25 is disposed adjacent the other end to form a water outlet chamber or sump 27.

The reference numeral 29 designates a water separating unit communicating with the inlet chamber 21 through a port 31 in the deck plate 19. The water separating unit is provided with a water and fuel coalescing cartridge 33 mounted on a perforated center tube 35 which is in communication with the inlet chamber 21 through the port 31.

The reference numeral 37 designates a permanent water separating element preferably constructed of screen of approximately 240 to 260 mesh, preferably 250-mesh which has an opening of approximately .002. A larger mesh screen such as 100-mesh may be used in certain applications, the only requirement being that the pore openings in the screen be smaller than the water droplets. The water separating element 37 is adapted to be nonpervious to water and pervious to fuel oil.

As illustrated in FIGURE 2, the membranes or wires 39 are coated with a polytetrafluorethylene resin 41. It should be noted that the polytetrafluorethylene resin is bonded or fused to the membranes 39 and that the entire exposed area, both inside and out, of the membranes is covered in its entirety. The screen structure thus becomes rigid and the pore openings 43 are absolutely fixed so that they cannot be forced to expand regardless of flow rate and pressure differential across the screen.

The water separating element 37 is constructed so that it surrounds the coalescing cartridge 33 and is closed at its ends by end caps 45 and 47. The lower portion of the water separating element is provided with a trough 49 having an opening 51 for draining the water into the sump 27. The water separating element 37 is slightly larger in diameter than the water coalescing cartridge 33 so that a space sufficiently large is provided to permit water to flow around the inside of the screen to the trough 49.

The separating unit 29 extends through an opening or port 53 in the partition 25 so that the water opening 51 is disposed in the chamber 27. The forward end 55 of the water separator is mounted or disposed 1° to 5° higher than the lower end 57 so that the water will flow toward the end 57 by gravity down the trough 49 to the opening 51.

In the operation of the water separator the emulsified fuel enters into the inlet chamber 21 through the fuel inlet 13 under pressure and flows into the center tube 35, through the water coalescing element 33 wherein the emulsion is broken and the water and oil is separated into their constituent forms. The fuel then passes through the water separating element 37 to the fuel outlet 15. The water separating element being nonpervious to water, the water droplets are collected along the inside of the screen and flow toward the trough 49 and then flow by gravity to the water outlet chamber 27 through the opening 51. The water then may be drained from the water outlet chamber 27 by manual or automatic drain means (not shown).

Referring to FIGURE 3, the reference numeral 59 designates a vertical water and fuel separator tank having a partition or deck plate 61 for supporting a water and fuel coalescing cartridge 63. A deck plate or partition 65 is mounted within the tank adjacent the upper portion and serves to support the water separating element 67. The water separating element 67 is constructed similar to the water separating element 37 with the exception of the omission of the trough 49. The screen mesh of the separating element is the same as that illustrated in FIGURE 2.

The cylindrical element 67 is mounted between two end caps 69 and 71 which are connected together by the tie rod 73. The tie rod is adapted to screw into a threaded opening (not shown) in the retainer 75 having a web or port 77. The perforated center tube surrounds the tie rod and extends through end cap 69 and communicates with the openings 77 in the web. The deck plate 65 is provided with an opening 79 large enough to allow the center tube to pass freely therethrough so that the clean fuel can flow to the outlet chamber 99.

In the operation of the water-fuel separator described in FIGURE 3 the emulsified fuel flows into the inlet chamber 81 through the fuel inlet 83 under pressure. The emulsified fuel then flows through the coalescing element 63 through a perforated center tube 85 and outwardly through the coalescing media into chamber 97 wherein the water and fuel are separated into their constituent forms.

The fuel after leaving the coalescing cartridge 63, flows upwardly through the water separating element 67 to the fuel outlet 87 through the perforated tube 89, port 79, port 77, and chamber 99. The water droplets have a tendency to fall downwardly toward the deck plate 61, however, due to the velocity of the fuel some of the water droplets will be carried toward the water separating element 67. The water separating element 67 repels the water droplets and when one or more water droplets merge on the element they will attain sufficient weight in which to fall in the fuel toward the deck plate 61 and may be drained through the water drain 91. A manual or automatic drain valve (not shown) may be connected to the water drain.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

I claim:

1. A water-fuel separator comprising a tank having a fuel inlet and a fuel outlet, said fuel outlet being disposed in the upper portion of said tank and a water drain disposed in the lower portion of said tank, a partition disposed in said tank to prevent communication between said fuel inlet and fuel outlet, a water and fuel coalescing cartridge connected to the partition, said partition having a port therein for communication with said cartridge, permanent hydrophobic straining means disposed externally of said cartridge to receive the mixture issuing from said cartridge, the improvement comprising said permanent straining means having a wire mesh of between 240 and 260 mesh, inclusive with very small fixed pore openings and having all its exposed area coated with polytetrafluorethylene resin whereby the coating of the filaments is fused at each intersection thereof to render the permanent straining means hydrophobic so that the water drops will be restrained and flow toward the water drain while passing the fuel toward the fuel outlet.

2. A water-fuel separator comprising a tank having a fuel inlet and a fuel outlet, said fuel outlet being disposed in the upper portion of said tank and a water drain disposed in the lower portion of said tank, a first partition disposed in said tank to prevent communication between said fuel inlet and fuel outlet, a water and fuel coalescing cartridge connected to the first partition, said first partition having a port therein for communication with said cartridge, the improvement comprising a second partition disposed in said tank to prevent communication between said fuel outlet and water drain, permanent hydrophobic straining means surrounding said cartridge to receive the mixture issuing from said cartridge, said straining means having a wire mesh of between 240 and 260 mesh, inclusive with very small fixed pore openings and having all its exposed area coated with polytetrafluorethylene resin whereby the coating of the filaments is fused at each intersection thereof, said second partition having a port for communication with the straining means, said straining means adapted to restrain the water drops so that the pressure differential created by the flow of fuel will not force water droplets through the straining means but will resist the water droplets so that they will flow toward the water drain while passing the fuel toward the fuel outlet.

3. A permanent water separator element for a water-fuel separator comprising a hydrophobic screen having a wire mesh with very small fixed pore openings, said screen being between 240 and 260 mesh, inclusive, and having all of its exposed area coated with polytetrafluorethylene resin, the coating of the filaments being fused at each intersection thereof, whereby the interfacial tension between the screen and water increases to repel the water while passing the fuel.

References Cited in the file of this patent

UNITED STATES PATENTS

| | | |
|---|---|---|
| 1,843,242 | Rafton | Feb. 2, 1932 |
| 2,555,607 | Robinson | June 5, 1951 |
| 2,657,808 | Mankin | Nov. 3, 1953 |
| 2,707,563 | Kasten et al. | May 3, 1955 |
| 2,725,986 | Marvel | Dec. 6, 1955 |
| 2,788,125 | Webb | Apr. 9, 1957 |
| 2,826,307 | Pace | Mar. 11, 1958 |
| 2,843,502 | Fay | July 15, 1958 |
| 2,872,043 | Fitzgerald | Feb. 3, 1959 |